G. F. SWIFT, Jr.
REFRIGERATOR CAR.
APPLICATION FILED SEPT. 10, 1918.
1,363,374.
Patented Dec. 28, 1920.
5 SHEETS—SHEET 1.
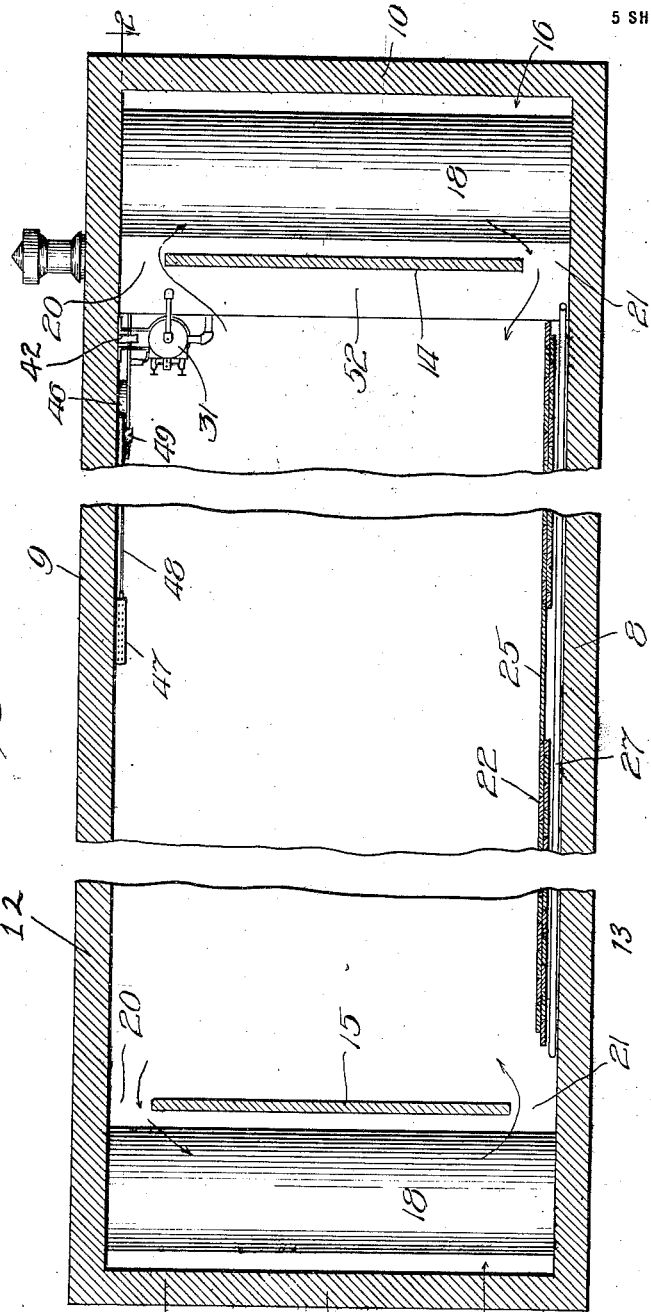

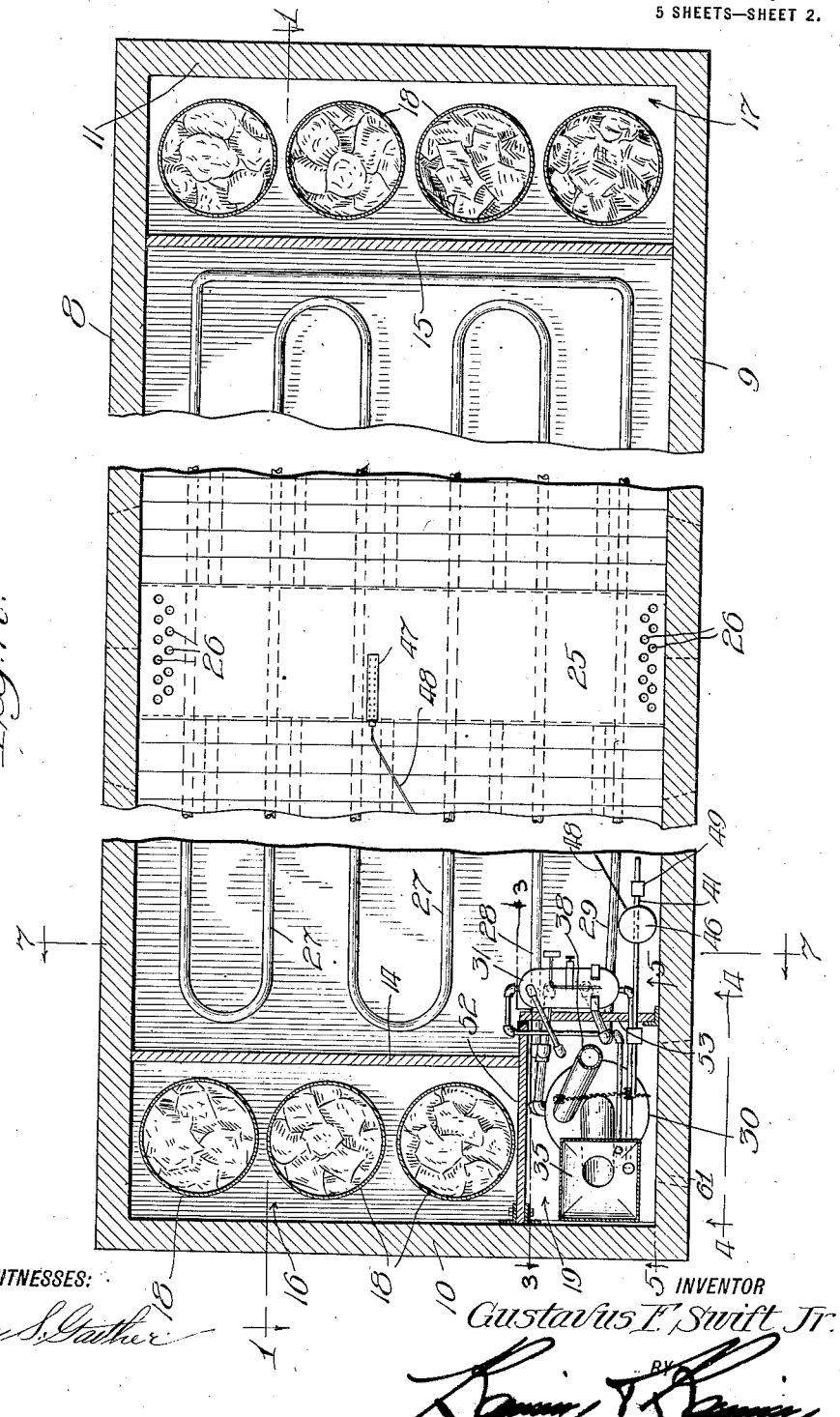

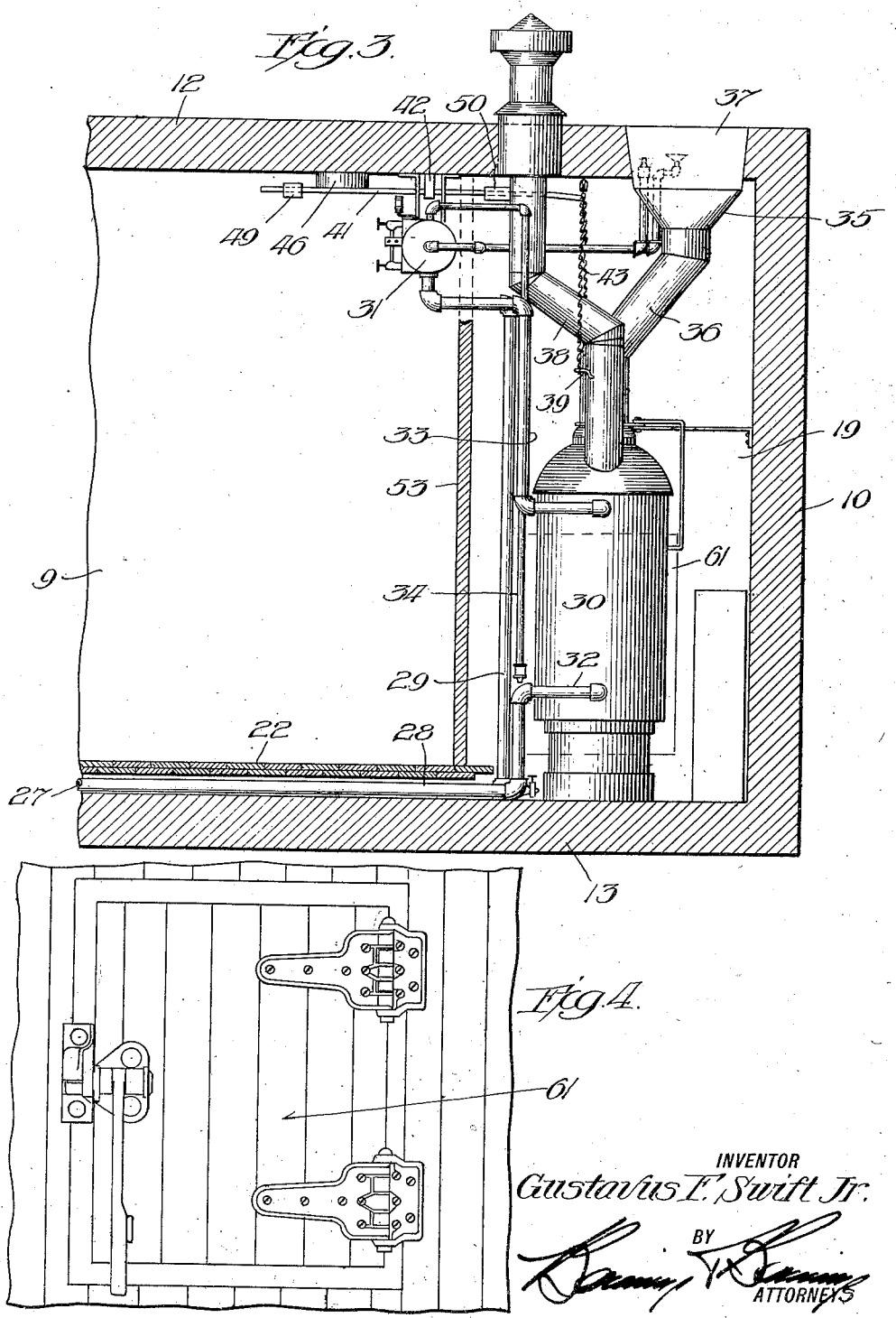

G. F. SWIFT, Jr.
REFRIGERATOR CAR.
APPLICATION FILED SEPT. 10, 1918.

1,363,374.

Patented Dec. 28, 1920.
5 SHEETS—SHEET 4.

WITNESSES:
Harry S. Gaither

INVENTOR
Gustavus F. Swift Jr.
ATTORNEYS

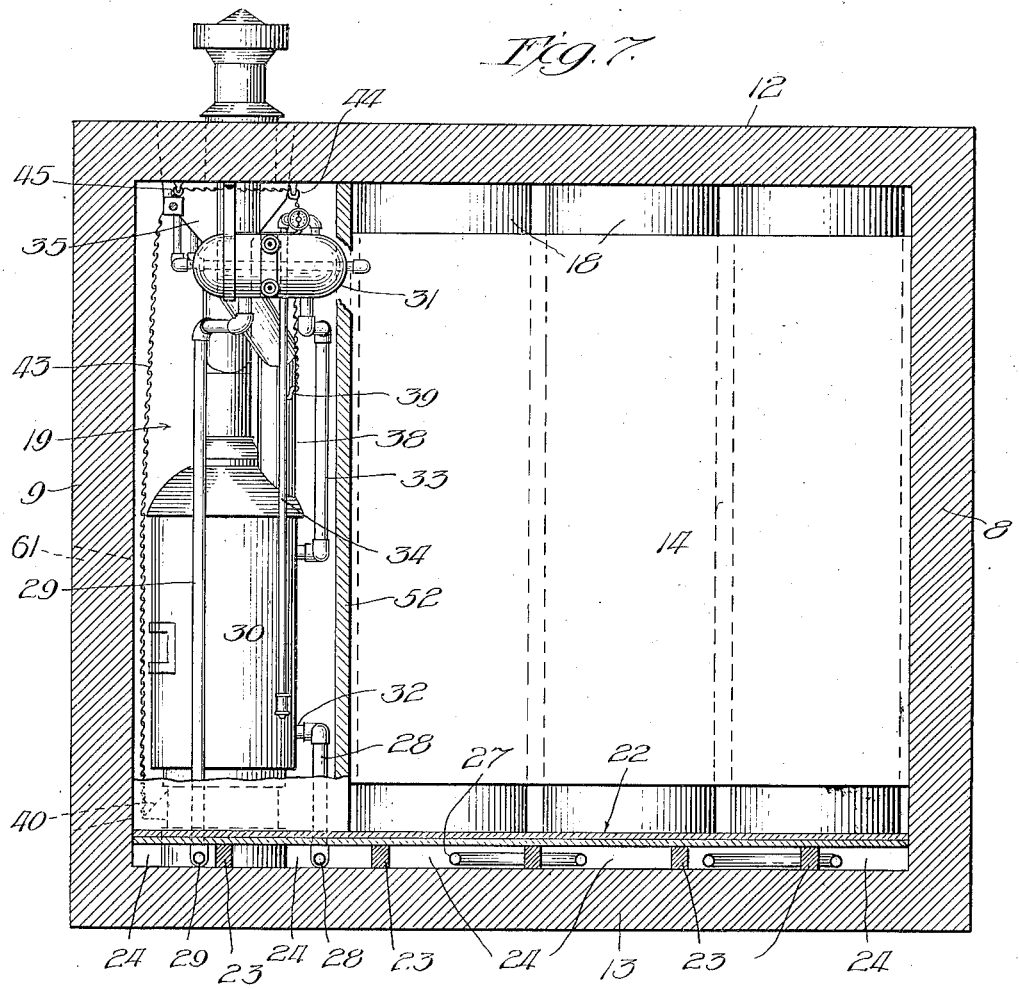

UNITED STATES PATENT OFFICE.

GUSTAVUS F. SWIFT, JR., OF CHICAGO, ILLINOIS, ASSIGNOR TO SWIFT AND COMPANY, OF CHICAGO, ILLINOIS, A CORPORATION OF ILLINOIS.

REFRIGERATOR-CAR.

1,363,374. Specification of Letters Patent. Patented Dec. 28, 1920.

Application filed September 10, 1918. Serial No. 253,490.

*To all whom it may concern:*

Be it known that I, GUSTAVUS F. SWIFT, Jr., a citizen of the United States, residing at Chicago, in the county of Cook and State of Illinois, have invented certain new and useful Improvements in Refrigerator-Cars, of which the following is a specification.

The present invention has to do with improvements in refrigerator cars and the like, and has particular reference to the construction of a car in which a substantially uniform temperature may be secured irrespective of wide variations in the outside or out-door temperature. Such cars are used, for example, in the shipment of meats and other perishable food products, although it will presently appear that the usefulness of the cars in actual service is not limited to the foregoing or any other class of goods.

In order, however, that certain features of the invention may be better understood and their desirability and significance be better appreciated, I will explain the climatic conditions existing in some sections of the country through which the shipments are made in large quantities, and I will also explain the theoretically desirable and correct conditions under which meats and the like should be shipped.

Wide experience has shown that, in order to preserve fresh meat for a considerable length of time without resorting to the freezing process, it should be kept at a substantially uniform temperature above 32 degrees F., and not to exceed 38 degrees F. above zero. Experience has shown that, under these conditions, the meat will keep for a long time without appreciable deterioration and without loss of flavor and resulting depreciation of selling value.

During the cold months of the year, and particularly during the winter months, the temperature in the plains regions falls many degrees below zero F., frequently going to 30 or 40 degrees below zero. At the same time the temperature on the Pacific Slope of the Rocky Mountains will frequently be 40 or 50 degrees above zero, so that any shipment between these regions will encounter very wide variations of temperature. Manifestly if the car be shipped across the plains regions, under such conditions its contents will be liable to freeze, whereas if the same materials be shipped across the Pacific Slope, under such conditions, it will be liable to become too warm and deteriorate. If the car should be iced before starting on its journey from the plains regions, its contents would become frozen before reaching the Pacific Slope, although thereafter they would remain cold. On the contrary if the car should be heated before starting on its journey so as to prevent its contents from freezing, it would become overheated upon reaching the Pacific Slope and its contents thereby deteriorated.

One of the objects of my present invention is to provide such an arrangement that the temperature of the car will be kept substantially constant at all portions of the journey, the car being heated when necessary, as when traveling across the plains, and being cooled when necessary, as when traveling down the Pacific Slope. That is, the car is provided with heating and cooling appliances so related and so coöperating as to maintain a substantially uniform temperature within the car at all times regardless of fluctuations of outside temperature both above and below the stipulated interior or car temperature.

Another object in this connection is to so arrange the car and its equipment that the desired substantially uniform temperature will be maintained at all portions of the trip without the necessity of any particular attention on the part of operators or railway men during the entire journey.

Other objects and uses of the invention will appear from a detailed description of the same which consists in the features of construction and combinations of parts hereinafter described and claimed.

Referring to the drawings:

Figure 1 shows a vertical longitudinal section through a car embodying the features of the present invention, portions of the car being broken away so as to shorten up the figure. It may be considered that Fig. 1 is a section taken on the line 1—1 of Fig. 2, looking in the direction of the arrows;

Fig. 2 is a horizontal longitudinal section corresponding to Fig. 1, and may be considered a section taken on the line 2—2 of Fig. 1, looking in the direction of the arrows;

Fig. 3 is a fragmentary vertical end section taken on the line 3—3 of Fig. 2, looking in the direction of the arrows and on enlarged scale;

Fig. 4 is a fragmentary side view of the lower end corner of the car showing the door which gives access to the hot water heater compartment, and may be considered a view on line 4—4 of Fig. 2, looking in the direction of the arrows;

Fig. 7 is a cross section taken on the line 7—7 of Figs. 2 and 5, looking in the direction of the arrows.

Figure 5:
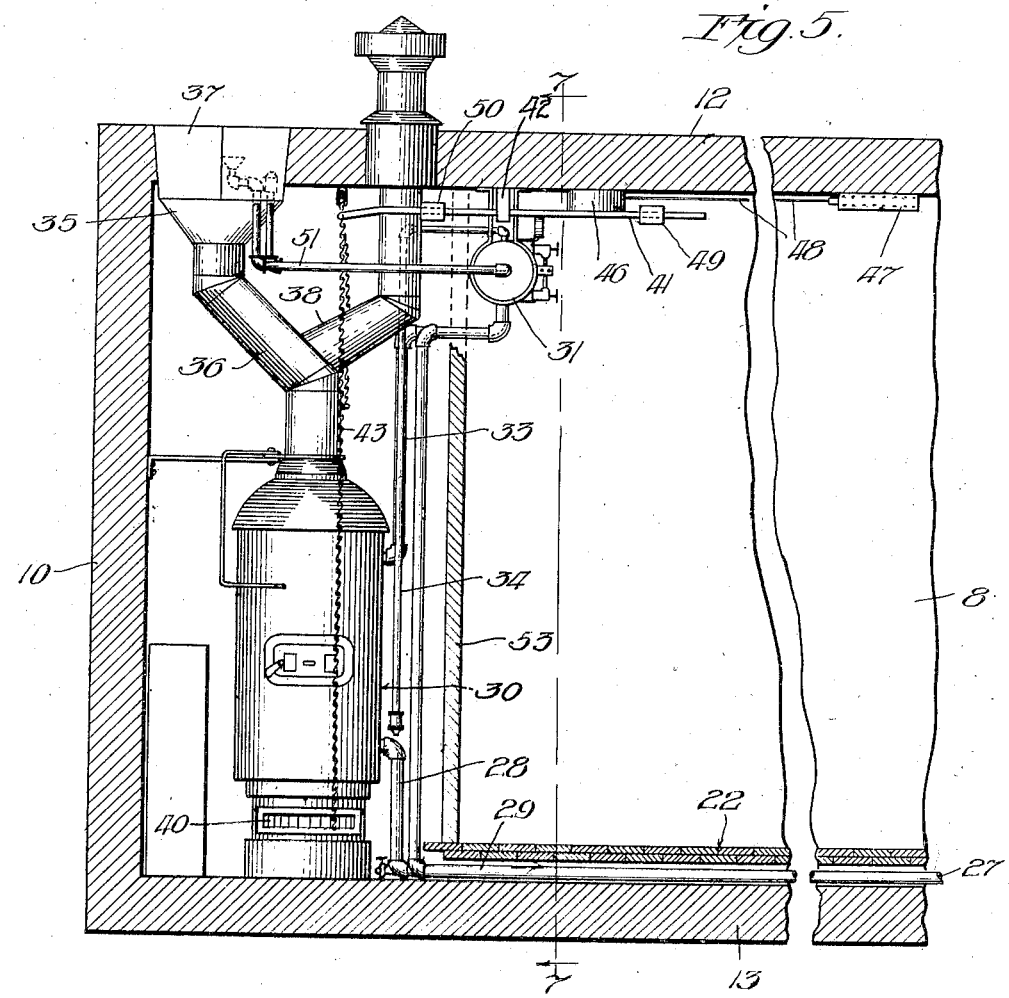
Fig. 5 shows a fragmentary vertical section taken on the line 5—5 of Fig. 2, looking in the direction of the arrows.

The car itself may be of any familiar or ordinary type of construction including the side walls 8 and 9 and the end walls 10 and 11. It is provided with a roof 12 and a floor 13, all of which may be of ordinary construction.

Adjacent to one end on the interior of the car is a partition 14 and adjacent to the other end is a partition 15, said partitions providing icing chambers 16 and 17 respectively. Each of these chambers contains a plurality of ice chests or cases 18 which may be filled from the top of the car or in any other convenient manner. Other forms of construction may, of course, be used for the ice chambers, all at the convenience of the designer or constructor.

Three of these ice cases are shown at one end in the chamber 16, and four of them are shown in the chamber 17. The space which might be occupied by a fourth ice case in the chamber 15 is in the present construction occupied by a heater compartment which will be presently explained.

As will be readily appreciated from an examination of Figs. 1 and 7, the partitions 14 and 15 terminate short of the roof and floor of the car so as to provide the openings 20 above their upper ends and the openings 21 below their lower ends. The circulation of air will then be substantially as shown by the long arrows in Fig. 1, down and out into the body of the car through the passages 21, then up through the body of the car and back through the passages 20. This would be the natural circulation of the cold air created by the refrigerating effect. Along the central portion of the car, I provide a false floor 22, separated some distance above the floor 13 by means of the rails 23, to provide the air spaces 24, as particularly shown in Fig. 7. These air spaces 24 communicate at their extreme ends with the openings or passages 21; whereas in their central portions they communicate with the space beneath the transverse plate 25 which constitutes the central portion of this false floor. In its end or side wall portions, the plate 25 is provided with the perforations 26 as clearly shown in Fig. 2, so as to permit the air to rise in the central portion of the car.

A heating coil 27 winds back and forth through the various passages 24, its end portions 28 and 29 being brought together adjacent to the heater compartment 19.

When a warm or hot medium is circulated through the coil 27, the air within the passages 24 will be heated and will rise through the perforations 26 in the plate 25, so that a considerable portion of cold air coming from the compartments 16 and 17 will be in this manner preheated and its temperature raised to that point determined by the amount of heating action of the coil. In other words, when the coil is in operation, the air thrown into the car will be warmer than the temperature which it would attain in case the heating medium were not in operation.

Within the heater compartment 19 is a heater 30 which may be of any convenient type. Ordinarily it will be desirable to use either brine or a solution of calcium chlorid in water, since either of these solutions will have a freezing temperature considerably below zero, and will, therefore, be well adapted for use in regions subject to very low temperatures.

In conjunction with the heater 30 I have illustrated an expansion tank 31 of familiar type. The return pipe 28 is shown as connected into the lower portion of the heater at the point 32; whereas the hot pipe 29 is shown as being connected into the bottom of the expansion tank. Another pipe 33 connects from the upper portion of the heater into the bottom of the expansion tank, so that the flow of heating medium is from the heater through the pipe 33, through the expansion tank 31, down through the hot connection 29, and through the coil 27, and back through the return connection 28 into the heater at the point 32. An overflow pipe 34 may be provided for taking care of overflow from the expansion tank in the well known manner. The heater itself may be of any suitable construction, but it is preferably of the hopper type and there is preferably provided a hopper 35 at a greater elevation than the heater and connected to the heater by a flue 36, so that the coal or other fuel will naturally gravitate into the heater during a considerable period of time and without particular attention. A cover 37 gives access to the hopper 35 through the roof of the car.

The smoke stack 38 leading from the heater passes out through the roof of the car, and is provided with a damper 39. The heater is also provided with a draft damper 40 in its lower portion, and by manipulating both of the dampers 39 and 40, the heater may be readily controlled.

In order to secure automatic control of the heater, I contemplate the use of any automatic thermostat or similar temperature regulator, or in fact any regulator whereby the temperature within the car will automatically control the draft on the heater. In the particular construction shown in the drawings, a lever 41 is pivoted to the roof of the car at the point 42. A chain 43 has one end connected to the damper 40 and its other end connected to the damper 39, the chain passing over pulleys 44 and 45 in the roof of the car, as is clearly shown in Fig. 7.

The inner end of the lever 41 is connected to said chain, and its outer end is connected to an expansion or similar controlling device 46 by means of which the lever 41 will be rocked according to the temperature in the car. Such expansion or controlling devices are well known in the art, but a simple type is that illustrated which includes an ether thermostat 47 connected to the expansion or control device 46 by means of a tube 48. As the temperature within the car rises, the ether will respond and by operating within the chamber 46 rock the lever in the proper direction and so actuate the dampers that the draft on the heater will be lowered, so as to bring about a cooling effect, and vice-versa. The weights 49 and 50 which are slidably mounted on the lever 41 constitute a convenient means for setting the regulator according to the temperature which it is desired to maintain within the car.

Figure 6:
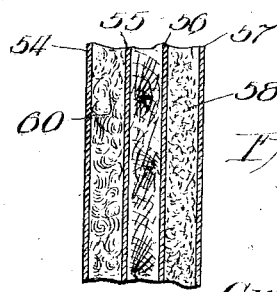
Figs. 6 is a fragmentary horizontal section on enlarged scale showing a convenient construction for the wall of the heater compartment.

The heating system may be filled with the heating medium through a pipe 51 or in any other suitable or convenient manner. The walls 52 and 53 of the heater compartment 19 may be built up in any suitable manner, but are preferably made of heat insulating material. A convenient type of construction is that illustrated in Fig. 6, in which each of said walls consists of four sheets of galvanized iron, 54, 55, 56, and 57, the intermediate spaces being filled respectively with felt 58, wood 59, and asbestos 60.

Access to the heater compartment 19 is readily provided through a door 61 which leads directly to the outside of the car, so that the heater can be attended to upon occasion without having to unlock the car itself.

While I have herein illustrated and described certain details of construction of the car itself, and of the heating and cooling systems, still I wish it understood that I do not limit myself to the same except as I may do so in the claims.

I claim:

1. A car of the class described having at each end a vertical partition stopping short of the roof and floor of the car to provide thereby an ice chamber communicating with the body of the car at its top and bottom ends, and permitting circulation of cooling air into the top end, downwardly through such ice chamber, and into the car at its bottom end, in combination with a false bottom or floor terminating short of each of said partitions to permit communication of air from beneath said false bottom into the body of the car adjacent to each of said partitions at its lower end, heating coils beneath said false bottom or floor and serving to heat the air beneath such floor to permit said heated air to rise at the ends of the said floor and commingle with the air descending through the cooling chambers, and thereby insure the delivery of streams of air into the body of the car which streams are the product of such commingling, substantially as described.

2. A car of the class described having at each end a vertical partition stopping short of the roof and floor of the car to thereby provide an ice chamber communicating with the body of the car at its top and bottom ends, and permitting circulation of cooling air into the top end, downwardly through such ice chamber, and into the car at its bottom end, in combination with a false bottom or floor terminating short of each of said partitions to permit communication of air from beneath said false bottom into the body of the car adjacent to each of said partitions at its lower end, heating coils beneath said false bottom or floor and serving to heat the air beneath such floor to permit said preheated air to rise at the ends of the said floor and commingle with the air descending through the cooling chambers, and thereby insure the delivery of streams of air into the body of the car which streams are the product of such commingling, and means for automatically regulating the heating effects of such coils according to the temperature existing within the body of the car, to thereby maintain constant temperature within the body of the car, substantially as described.

3. A car of the class described having at each end a partition stopping short of the roof and floor of the car to thereby provide an ice chamber communicating with the body of the car at its top and bottom ends, and permitting circulation of cooling air into the top end, downwardly through such ice chamber, and into the car at its bottom end, in combination with a false bottom or floor terminating short of each of said partitions to permit communication of air from beneath said false bottom into the body of the car adjacent to each of said partitions at its lower end, heating means beneath said false bottom or floor, serving to heat the air thereunder to permit said heated air to rise at the end of said false bottom or floor and commingle with the air descending from the adjacent cooling chamber, and means for regulating the heating effect of such heating means according to the temperature existing within the body of the car, substantially as described.

4. A car of the class described having at each end a cooling chamber, each of said cooling chambers being in direct communication with the body of the car at its top and bottom ends, whereby air entering each said chamber from the top of the car passes downwardly through said chamber, and delivers back into the body of the car at the lower end of said chamber, in combination with a duct for air extending longitudinally of the lower portion of the car and having each of its ends in communication with the body of the car adjacent to the point of communication of the lower end of the adjacent cooling chamber with the body of the car, means for heating the air within such duct, and automatic means for regulating the amount of such heating action according to the temperature existing within the body of the car, substantially as described.

5. A car of the class described having in one end a cooling chamber whose upper end is in communication with the upper portion of the body of the car, and whose lower end is in communication with the lower portion of the body of the car, whereby air may circulate into the upper end of said cooling chamber, downwardly through such chamber, and back into the body of the car at its lower end, in combination with a longitudinally extending duct for heating air in the lower portion of the car having its delivery end adjacent to the lower delivery end of the cooling chamber, and means for heating the air in such duct, whereby such heated air may enter the body of the car adjacent to the point of delivery of the cooled air, and whereby the heated and cooled streams of air may commingle as they enter the body of the car, substantially as described.

GUSTAVUS F. SWIFT, Jr.